US 6,636,899 B1

(12) United States Patent
Rabb et al.

(10) Patent No.: US 6,636,899 B1
(45) Date of Patent: Oct. 21, 2003

(54) ARCHITECTURE FOR SOFTWARE FOR REMOTE MAINTENANCE OF A MACHINE SUCH AS A COPIER

(75) Inventors: Khalid M. Rabb, Fairport, NY (US); Barbara E. Malinowski, Fairport, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/160,642

(22) Filed: Sep. 24, 1998

(51) Int. Cl.[7] .................................................. G06F 9/00
(52) U.S. Cl. ........................ 709/310; 709/104; 709/229; 713/201; 399/8
(58) Field of Search .................. 345/740, 741, 345/735, 744; 399/8; 709/328, 208, 310, 313, 227, 228, 236, 237, 223–226, 217, 219, 250, 229, 225; 713/151, 152, 201, 200

(56) References Cited

U.S. PATENT DOCUMENTS

| | | | | | |
|---|---|---|---|---|---|
| 3,882,305 A | * | 5/1975 | Johnstone | ................... | 700/180 |
| 4,257,101 A | * | 3/1981 | Holtey et al. | .................. | 710/1 |
| 4,390,953 A | * | 6/1983 | Johnstone | .............. | 379/102.01 |
| 4,812,996 A | * | 3/1989 | Stubbs | ................... | 324/121 R |
| 4,814,975 A | * | 3/1989 | Hirosawa et al. | .............. | 709/1 |
| 5,038,319 A | | 8/1991 | Carter et al. | ................ | 364/900 |
| 5,057,866 A | | 10/1991 | Hill, Jr. et al. | ................ | 355/200 |
| 5,084,875 A | * | 1/1992 | Weinberger et al. | ........... | 399/8 |
| 5,138,377 A | | 8/1992 | Smith et al. | ................ | 355/207 |
| 5,185,742 A | * | 2/1993 | Bales et al. | ................. | 370/409 |
| 5,282,127 A | * | 1/1994 | Mii | ........................... | 340/3.43 |
| 5,323,393 A | * | 6/1994 | Barrett et al. | ............... | 370/449 |
| 5,339,168 A | | 8/1994 | Evanitsky et al. | .......... | 358/402 |
| 5,361,336 A | * | 11/1994 | Atchison | .................... | 345/740 |
| 5,388,252 A | * | 2/1995 | Dreste et al. | ............... | 709/330 |
| 5,440,372 A | * | 8/1995 | Ito et al. | ..................... | 358/401 |
| 5,490,275 A | * | 2/1996 | Sandvos et al. | .............. | 455/84 |
| 5,491,796 A | * | 2/1996 | Wanderer et al. | ........... | 709/102 |
| 5,553,202 A | * | 9/1996 | Wakabayashi et al. | ....... | 428/195 |
| 5,564,109 A | * | 10/1996 | Snyder et al. | ................ | 399/8 |
| 5,586,255 A | * | 12/1996 | Tanaka et al. | .............. | 345/700 |
| 5,594,663 A | * | 1/1997 | Messaros et al. | .............. | 700/9 |
| 5,602,990 A | * | 2/1997 | Leete | ............................ | 380/2 |
| 5,636,008 A | * | 6/1997 | LoBiondo et al. | ............ | 399/10 |
| 5,774,063 A | * | 6/1998 | Berry et al. | ........... | 340/825.22 |
| 5,774,759 A | * | 6/1998 | Tanaka | .......................... | 399/8 |
| 5,790,977 A | * | 8/1998 | Ezekiel | ....................... | 702/122 |
| 5,793,951 A | * | 8/1998 | Stein et al. | ................. | 713/201 |

(List continued on next page.)

OTHER PUBLICATIONS

Tanenbaum, Andrew S. "Computer Networks." Third Edition. Prentice Hall, 1996. Chapter 1.*
Coulouris et al. "Distributed Systems, Concepts and Design." Chapter 3, Networking and Internetworking. 1994.*
Article by Bylinsky, "Fixing Machines From Afar," Fortune, Aug. 17, 1998, p. 174[B].

*Primary Examiner*—John Follansbee
*Assistant Examiner*—Lewis A. Bullock, Jr.
(74) *Attorney, Agent, or Firm*—R. Hutter

(57) ABSTRACT

Software in a computer which accesses one or more software-intensive devices, such as a digital copier or printer, is organized in a set of layers. A device-dependent layer converts data transferred over various means, such as a modem or network, to a uniform data format. A protocol layer converts data from a particular accessed machine to a set of function calls. A system interface associated with the computer restricts a user of the computer to seeing only a subset of function calls, depending permissions granted to a particular user. The modular architecture of the software enables a system administrator to restrict a user to viewing machine status for a specific set of machines on a network, or limits the user to viewing only a certain set of functionalities from a particular machine.

3 Claims, 2 Drawing Sheets

U.S. PATENT DOCUMENTS

| | | | | |
|---|---|---|---|---|
| 5,815,665 A | * | 9/1998 | Teper et al. | 709/229 |
| 5,818,511 A | * | 10/1998 | Farry et al. | 725/116 |
| 5,832,228 A | * | 11/1998 | Holden et al. | 709/225 |
| 5,850,582 A | * | 12/1998 | Inoo et al. | 399/10 |
| 5,909,545 A | * | 6/1999 | Frese et al. | 709/208 |
| 5,923,834 A | * | 7/1999 | Thieret et al. | 399/8 |
| 5,926,756 A | * | 7/1999 | Piosenka et al. | 455/418 |
| 5,940,591 A | * | 8/1999 | Boyle et al. | 713/201 |
| 5,959,539 A | * | 9/1999 | Adolph et al. | 340/10.6 |
| 5,974,459 A | * | 10/1999 | Chattopadhyay et al. | 709/224 |
| 6,044,402 A | * | 3/2000 | Jacobson et al. | 709/224 |
| 6,049,827 A | * | 4/2000 | Sugauchi et al. | 709/223 |
| 6,061,795 A | * | 5/2000 | Dircks et al. | 713/201 |
| 6,072,493 A | * | 6/2000 | Driskell et al. | 345/854 |
| 6,073,172 A | * | 6/2000 | Frailong et al. | 709/222 |
| 6,110,228 A | * | 8/2000 | Albright et al. | 707/200 |
| H1894 H | * | 10/2000 | Fletcher et al. | 455/403 |
| 6,157,953 A | * | 12/2000 | Chang et al. | 709/225 |
| 6,192,361 B1 | * | 2/2001 | Huang | 707/9 |
| 6,324,588 B1 | * | 11/2001 | Desruisseaux et al. | 709/313 |

* cited by examiner

ARCHITECTURE FOR SOFTWARE FOR REMOTE MAINTENANCE OF A MACHINE SUCH AS A COPIER

FIELD OF THE INVENTION

The present invention relates to software for interactive communication with a machine, such as a copier or printer, enabling remote status inquires and maintenance of the machine. Specifically, the present invention relates to a specific architecture for such software which facilitates many practical advantages.

BACKGROUND OF THE INVENTION

With the increasing sophistication of office equipment, such as digital copiers, printers, facsimiles, as well as devices which combine many of these functions, individual devices become more and more software intensive. Much of the functionality associated with a particular device dwells in the software of the device, and functionalities of a device can be monitored, improved or increased via the machine software. Preferably, such software access could be performed, for example, by a tech rep attending the device and plugging in a personal computer or laptop into the device for direct access to or downloading of software; or, the software could be accessed or installed in a device remotely, over a network.

Whatever the specific physical means used to access the internal software of a particular machine, it is most desirable to provide a common "application" enabling a human user to view and if necessary alter the machine conditions through the user's computer. It is most desirable that the application for interacting with a particular machine be indifferent to the specific physical means (network, modem, direct connection, IR, etc.) by which a particular machine is accessed.

Further, it is likely that a relatively large population of machines, such as digital copiers or printers, may be accessed in various ways by a relatively large population of human users or administrators. Depending on the level of interaction with the internal software of various machines, it may be desirable to give some human users, such as administrators, fairly detailed access to the internal software of a particular machine (e.g., voltage levels within the printer hardware, analysis of the long-term use of the machine), while other users are given only limited access to only the most basic software functions (e.g., simply determining whether a printer is available for use). Of course, there is also a necessity to give some users access to only some machines, with different users access to other machines. There is thus a need to set-up what is in effect "read" and "write" privileges relating various users to specific functions within various machines.

DESCRIPTION OF THE PRIOR ART

U.S. Pat. Nos. 5,038,319; 5,057,866; 5,138,377; and U.S. Pat. No. 5,339,168 are examples of basic concepts of "remote interactive communication" with machines such as printers and copiers.

The article by Bylinsky, "Fixing Machines From Afar," Fortune, Aug. 17, 1998, page 174[B], describes a number of techniques currently available for remote repair, diagnostics, and maintenance of various complicated machines.

SUMMARY OF THE INVENTION

According to one aspect of the present invention, there is provided a program, operable on at least one computer, for accessing machine software operative of a machine. A protocol layer converts data derived from the machine software to a set of function calls, the function calls being exportable to an application for viewing on a user interface. A system interface applies a set of permissions to the function calls from the protocol layer, whereby only a permitted subset of function calls may be exported to an application.

DETAILED DESCRIPTION OF THE INVENTION

Figure 1:
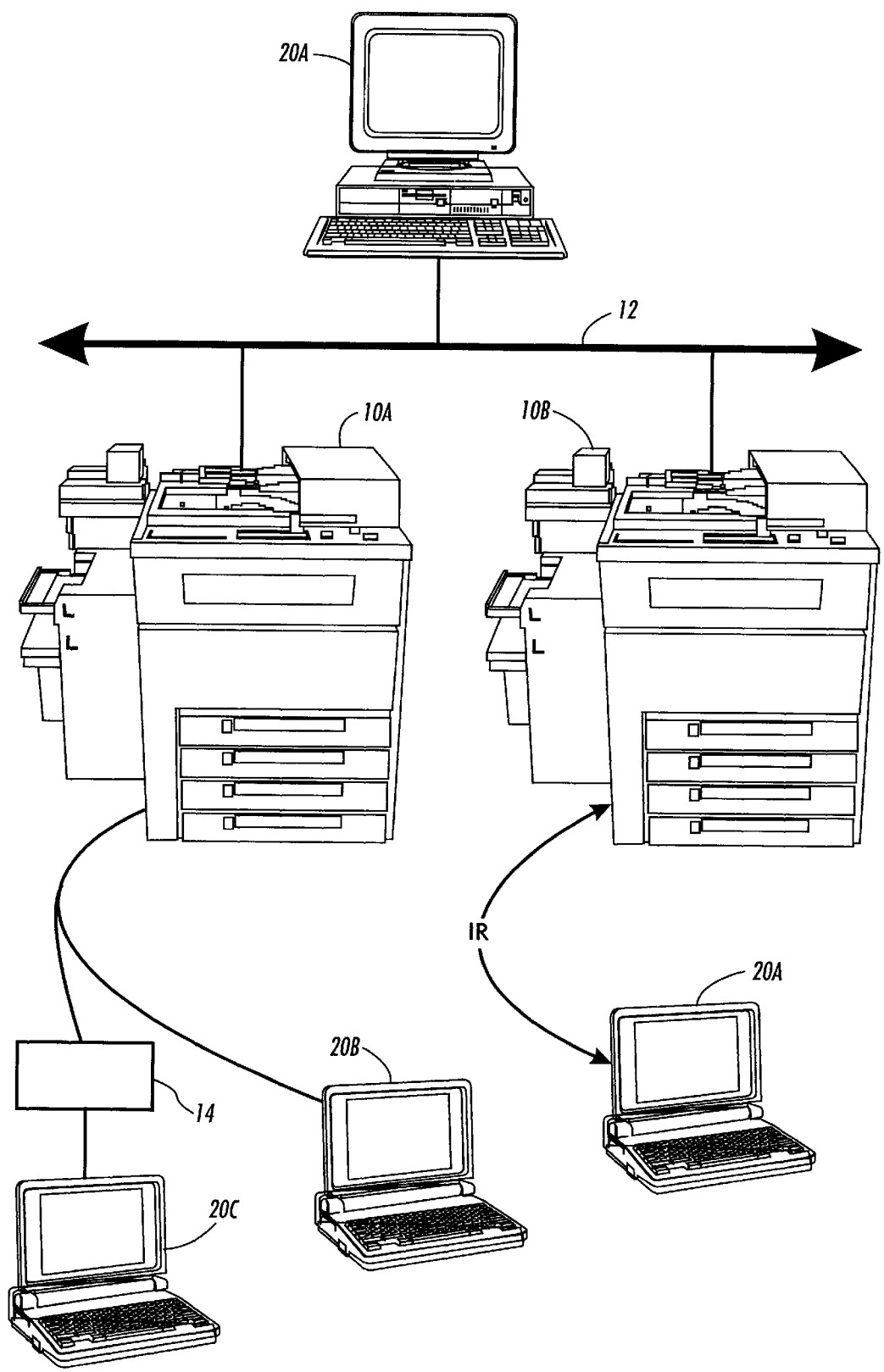
FIG. 1 is a simplified systems diagram showing various techniques for accessing machine-based software for purposes of remote repair, diagnostics, and maintenance.

FIG. 1 is a simplified diagram showing how a number of reasonably complex machines, in this case digital copiers 10a, 10b, can be accessed in various ways while they are being used by customers. In brief, machines such as digital copiers include a great deal of internal software for operation of the electromechanical systems therein. This internal software can be accessed in various ways, such as to detect failures, determine when regular maintenance is necessary, and even to alter the operation of the machine remotely.

Typically, in the context of office equipment, there are any number of ways in which the internal software of a machine such as 10a, 10b could be accessed. As most digital printing equipment is based on a network, the machine could give access to its internal software through a network 12 which connects to any one of a number of computers such as 20a, which may be located anywhere in the world. A customer service engineer (CSE) or "tech rep" can come out the customer site and directly couple his laptop computer, such as 20b, directly to a port in the machine 10a, or a computer such as 20c can interface with the machine 10a through a modem 14, using telephone lines. Alternately, a tech rep can access a suitably-equipped machine such as 10b with an infrared (IR) communication link, as shown.

The present invention is a software architecture which allows different users to have different levels of interaction with different machines, and also allows certain users to access only a subset of machines needed for particular business purposes. Also, the present invention facilitates a common "application" for user interface, which can be used by all users, whether remote or directly connected to the particular machine, in which the actual connection to the machine is essentially invisible to the user.

Figure 2:
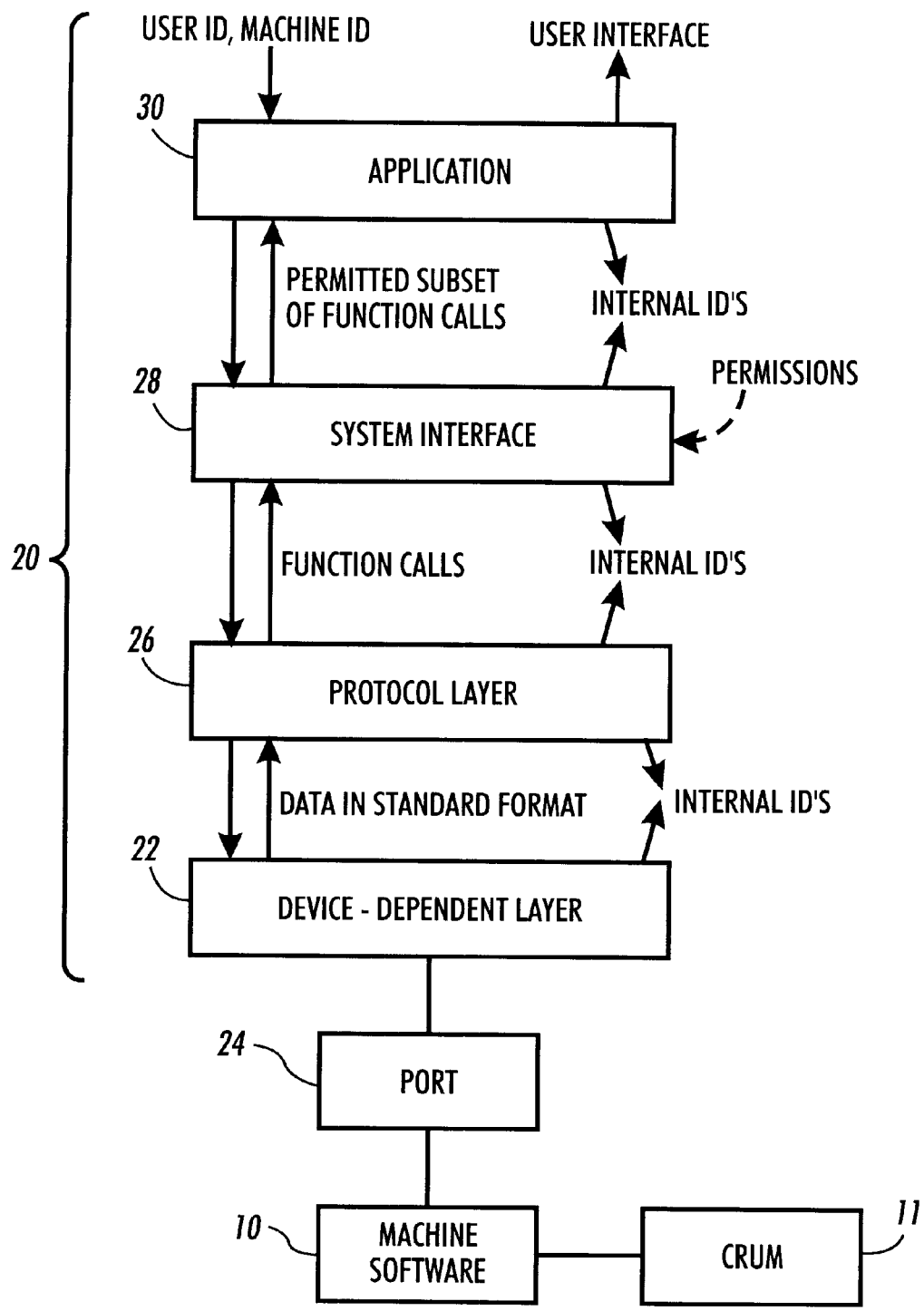
FIG. 2 is a diagram showing the architecture of the software according to the present invention.

FIG. 2 shows the basic architecture of the software according to the present invention. As shown, the software is generally indicated as 20, which is intended to mean that the software 20 can reside on any type of personal computer or laptop such as the computers 20a, 20b, 20c, or 20d in FIG. 1, or even on the user interface of a machine itself. Once again it is an essential feature of the present invention that the basic software can reside on any computer and needs only minimal modifications depending on whether the software is for remote, network, modem, or other kind of access to one or more machines.

According to a preferred embodiment of the present invention, the software residing on a particular computer 20 has four layers. Significantly, according to the present invention, these four layers are distinct from each other in that they interface with each other exclusively through distinct channels, so that, for example, information in a particular level must travel through intervening layers in order to get to another layer, as shown. (It is also conceivable that different layers can reside on different "computers" or CPUs, with for instance one layer on a tech rep's lap-top and another layer operating on the CPU within a machine 10 itself.) Device-dependent layer 22 interacts through a port 24 with the machine software in a particular machine 10. (In the context of office equipment a particular machine 10 may further include a quantity of memory in a "consumer replaceable unit monitor," or CRUM, indicated as 11 and which will be explained in detail below.) For purposes of the present discussion, the port 24 can be any type of machine interface suitable for accessing the machine software: the port 24 could be a direct cable connection, a network, a modem, IR interface, etc.

The function of the device-dependent layer 22 is to convert data from a machine 10 coming through port 24 to a uniform format, regardless of the particular mechanism of port 24. For example, if the port 24 is an infrared link, the actual binary data from a particular machine 10 may be of a specific format in order to enable the IR link; yet another format for port 24 may be required when the data from machine software 10 is sent over the internet (in the claims herein, the different formats for different communication means are called "port formats"). The device-dependent layer 22 converts the data from port 24 to a standard format, so that the rest of the system is thereby indifferent to the physical nature of the port 24. In brief, device-dependent layer 22 may include any number of lookup tables for converting raw data from one of any number of port formats into a standard format.

Once the data from machine 10 is converted by device-dependent layer 22 to a standard format, the data can be accessed by what is here called a protocol layer 26. Protocol layer 26 packages data so that the source of the data (in this context, a particular machine 10), and the destination of the data (typically a particular application program on a particular computer 12, the computer itself possibly being on a network), along with the suitable data format, can be determined. Protocol layer 26 is thus essentially a set of application programming interfaces, or API's, which convert the data in standard format from device-dependent layer 22 into a series of function calls, which could be accessed by an application program for viewing through a user interface, such as on a computer 20.

System interface 28 determines what data from protocol layer 26 can be exported to a particular client, and converts the data from protocol layer 26 to a client-desired format for viewing. The system interface 28 thus requires a set of permissions which match the ID's of a particular user using a particular computer 20 with the ID's of particular machines 10 to which the particular computer 20 can access; further, the system interface 28 can allow a particular user to access only a subset of all possible function calls which are present in protocol layer 26. These permissions can be essentially permanently associated with a particular computer 20, or can be established over a large number of computers through a system administrator, through means known in the art.

The top level of the software in computer 20 is an application layer 30. Basically, the application layer 30 is simply a user interface program by which a permitted subset of function calls (that is, the function calls which system interface 28 permits a particular user to view from protocol layer 26) can be viewed by a human user. The human user can be a systems administrator, a customer service engineer or "tech rep," or the end user of a particular machine.

When a user (whether a tech rep, systems administrator, end user, or third-party tech rep) accesses a machine through computer 20, the user typically submits via application layer 30 a user ID and/or an ID relating to a particular machine desired to be accessed. It is possible that submission of a user ID to system interface 28 may cause system interface 28 to automatically identify one or more machines on a network that user is permitted to access. The system interface 28 also identifies, based on the user ID, which subset of function calls, relating to which functionalities in a machine 10, the particular user is permitted to access. Typical "functionalities" which relate to the function of a machine 10 that a user may wish to view include (in the office-equipment context) the number of prints output since last access; average number of prints per day; fault codes recently generated by the machine's internal software; and information about replacement of various parts. Each of these functionalities relate to one or more function calls which are made available by the protocol layer, having been ultimately derived from the machine software 10.

However, in real-world situations, it may be desirable to permit, for instance, only systems administrators, and not end users, to view certain information. Also, function calls can, in a preferred embodiment, be used to send data to machine software, such as to reset or correct the operation of a particular machine; one would want to restrict the ability to move data to the machine software to qualified tech reps. For this reason, it is important that the permissions system in system interface 28 be able to restrict to which machines a user has access, and also which functionalities a user is allowed to access or use in a machine.

Because system interface 28 can use a system of permissions to permit access by a particular user using computer 20 to only a particular machine or set of machines 10, and/or a particular set of function calls from protocol layer 26, facilitates any number of important business arrangements which are useful particularly in the office equipment industry. For example, the permissions within system interface 28 can be designed to restrict the operation of a particular computer 20 to, for example, direct connection only, preventing a particular computer 20 from remotely accessing a particular machine 10 such as through a network 12 or even through a modem 14. The system interface can selectably restrict a particular computer 20 from accepting certain software upgrades or wizards such as available through network 12.

Also shown in FIG. 2 between various layers such as protocol layer 26 system interface 28 is capability for exchanges of "internal ID's" between various layers. For instance, there could be a provision that the system interface 28 can obtain a particular function call from protocol layer 26 only by submitting an internal ID number from the system interface 28 to protocol layer 26; such an arrangement could be a vehicle for restricting a particular user from accessing function calls in protocol layer 26 relating to certain non-permitted functionalities. To take another example, submission of a certain user ID or machine ID to application layer 30 may cause application layer 30 to activate suitable internal ID's for accessing function calls through system interface 28. Application 30 may have to submit an internal ID (which may be tied to the particular hardware on which application 30 resides) to system interface 28 to obtain any access to system interface 28.

The internal ID system can be used to facilitate certain types of use restrictions on certain computers 20: for instance, if a particular computer 20 is resticted to local use only, device-dependent layer 22 may require submission of an internal ID (ultimately from system interface 28, where it may not exist, if the particular computer 20 is restricted) to device-dependent layer 22 before activating parts thereof which enable remote (network or modem) connections to a machine. Preferably, this exchange of an internal ID between these two layers is completely invisible to a user viewing application 30. This feature makes a computer 20 operating machine 10 substantially more difficult to "hack," that is, to permit a user to obtain access to functionalities in the machine software to which he has not been given access.

Also, for various reasons it may be desirable to require internal ID's to be submitted "upwards" in the direction of the Figure: for instance, device-dependent layer 22 may have to submit an internal ID relating to a particular machine 10 up to system interface 28 (via protocol layer 26, in the illustrated embodiment), as a means of preventing a machine 10 which is not on a service contract from sending a hardware error message ultimately to an application 30.

In terms of restricting the particular functionalities, in terms of sets of function calls from protocol layer 26, to which a particular user can have access, typical types of function calls which would be restricted to a particular user may include: the billing data; a customer profile (that is, a record of how often a particular customer is using a particular machine); and data which may be stored in the customer replaceable unit monitor (CRUM) 11 which is installed in the machine 10. Very often, particularly in office equipment, a replaceable unit in the machine, such as a toner cartridge or fuser unit, may include a chip thereon, typically comprising an EEPROM, which functions as a "odometer" for the replaceable part (showing the accumulated wear or use of the part), or else may contain information relating to the desired use of the particular part (e.g., how much voltage should be sent to the part).

While this invention has been described in conjunction with various embodiments, it is evident that many alternatives, modifications, and variations will be apparent to those skilled in the art. Accordingly, it is intended to embrace all such alternatives, modifications, and variations as fall within the spirit and broad scope of the appended claims.

What is claimed is:

1. A program, operable on at least one computer, for accessing machine software operative of a machine, comprising:
   a protocol layer for converting data derived from the machine software to a set of function calls, the function calls being exportable to an application for viewing on a user interface; and
   a system interface for applying a set of permissions to the function calls from the protocol layer, whereby only a permitted subset of function calls may be exported to an application, wherein a subset of permissions restrict access to billing data associated with the machine.

2. The program of claim 1, wherein the system interface submits an internal ID to the protocol layer in order to access a particular function call.

3. The program of claim 1, further including an application layer interfacing with the system interface, the application layer creating a user interface, the application accessing function calls from the protocol layer exclusively through the system interface.

* * * * *